UNITED STATES PATENT OFFICE.

CYRUS M. WARREN, OF BROOKLINE, MASSACHUSETTS.

IMPROVEMENT IN ROOFING MATERIALS.

Specification forming part of Letters Patent No. 179,830, dated July 11, 1876; reissue No. 7,327, dated September 26, 1876; application filed September 14, 1876.

*To all whom it may concern:*

Be it known that I, CYRUS M. WARREN, of Brookline, in the county of Norfolk and State of Massachusetts, have invented a new and useful Improvement in Roofing Material, which improvement is fully described in the following specification:

The object of my invention is to provide a durable but inexpensive material to interpose by alternate layers between the layers of slate, tile, or shingles, in the construction of steep roofs, at a saving of cost, with better protection against water and currents of air, and for other purposes.

My invention consists in a roofing felt or paper, produced by saturating felt or paper with tar, then applying to the same a surface-coating of a sun-proof pitch, which is prepared as a residual product in the distillation of coal-tar at a temperature of about 700° Fahrenheit, or at a point at which this residuum shall have acquired the negative property of not softening or running on a steep surface when exposed to the direct rays of the sun.

In carrying out my invention, I take a good quality of felt or paper in rolls, and saturate thoroughly with tar, in the usual manner, as practiced in the manufacture of the ordinary tarred felt employed, in combination with soft pitch and gravel, for flat roofs.

When sufficiently dried, the tarred felt is ready for the application of the preparation of sun-proof pitch, which may be made to one or both surfaces; but I prefer to apply it to but one; and this is done by passing the tarred felt, as it is unrolled, over and in contact with the upper surface of a revolving horizontal cylinder, the lower surface of which is immersed in a tank of the melted and hot sun-proof pitch. The surface of the tarred felt thus becomes roughly and thickly coated; but this is reduced to a smooth and even surface, and to a desirable thickness, by passing the felt thence between two adjustable revolving press-cylinders, which are maintained at a suitable temperature by the introduction of steam into the interior.

The sun-proof coated felt leaves the press-cylinders in a finished condition, and is immediately formed into rolls of convenient size for use, the coating of sun-proof pitch being firmly combined with the felt or paper by the tar with which said paper or felt has been saturated, while, at the same time, this coating hardens quickly, so that the rolls can be formed immediately without danger of getting the several layers stuck together.

That the nature of my invention may be more clearly defined, I would state, that up to the present time only soft pitch has been employed to spread on the surface of tarred felt in the manufacture of roofs, and its use, therefore, has been almost exclusively restricted to flat roofs, or those having but a slight inclination; and, even as thus employed, it has been found an indispensable requisite that the pitch should be filled with gravel, sand, asbestus, or equivalent material, to prevent its running into the gutters and ruining the roof.

My invention provides, on the contrary, a tarred felt covered with a hard material of definite heat-resisting power, sufficient to overcome the necessity of using a filling of foreign material to prevent its running, thus rendering it serviceable for purposes for which the other is not adapted.

I am aware that it has been proposed to substitute melted pitch or asphaltum for coal-tar as a saturating material for roofing paper or felt, the melted pitch adhering to the surface being completely removed, while hot, by passing the paper between scrapers; but this has not been found a useful substitute, and, therefore, has not come into use; nor is a paper or felt saturated with asphaltum in this manner, with the surface-coating of asphaltum purposely removed, to be regarded as in any respect similar or equivalent to mine, saturated as it is with coal-tar containing all of its natural softening-oils, and then purposely spread over with a layer of hard pitch of peculiar consistency, made especially to resist a certain degree of heat.

I do not claim paper or felt saturated either with coal-tar or asphaltum, nor paper or felt saturated with either of these and coated with ordinary pitch.

What I claim as new, and desire to secure by Letters Patent, is—

A roofing material composed of felt or paper, saturated with tar, and provided with a surface-coating of sun-proof pitch, substantially as described.

In testimony that I claim the foregoing I have hereunto set my hand and seal this 11th day of September, 1876.

C. M. WARREN. [L. S.]

Witnesses:
W. HAUFF,
E. F. KASTENHUBER.